United States Patent [19]

Gravey et al.

[11] 4,075,278

[45] Feb. 21, 1978

[54] PROCESS FOR RECOVERING MOLYBDENUM VALUES FROM SPENT CATALYSTS

[75] Inventors: Guy Gravey, Saint Marcel; Paul Grolla; Andre Roth, both of Moutiers, all of France

[73] Assignee: Metaux Speciaux S.A., Paris, France

[21] Appl. No.: 765,383

[22] Filed: Feb. 3, 1977

[30] Foreign Application Priority Data

Nov. 22, 1977 France .................. 77 35867

[51] Int. Cl.$^2$ .......................... C01G 39/00
[52] U.S. Cl. ...................... 423/55; 423/53; 423/61; 423/606; 423/593; 75/121
[58] Field of Search ............. 423/53, 55, 56, 61, 423/606; 75/97 R, 101 R, 121

[56] References Cited

U.S. PATENT DOCUMENTS

| | | | |
|---|---|---|---|
| 1,293,404 | 2/1919 | Giles et al. | 423/55 |
| 1,948,407 | 2/1934 | Watts | 423/55 |
| 2,367,506 | 1/1945 | Kissock | 423/55 |
| 2,949,339 | 8/1960 | Marvin | 423/55 |
| 3,622,301 | 11/1971 | Mehl et al. | 423/53 |
| 3,773,890 | 11/1973 | Fox et al. | 423/61 |

*Primary Examiner*—Herbert T. Carter
*Attorney, Agent, or Firm*—Dennison, Dennison, Meserole & Pollack

[57] ABSTRACT

A process of recovering molybdenum from waste products and particularly from spent catalyst based on active alumina and containing molybdenum compounds comprising mixing the spent catalyst with sodium carbonate powder, adding water and remixing to absorb the water in the catalyst particles, baking the mixture to convert the molybdenum present to sodium molybdate, treating the mixture at ambient temperature with carbon dioxide gas, treating the resultant mixture with hot water to dissolve the sodium molybdate, neutralizing and clarifying with concentrated nitric acid, and precipitating to produce molybdic acid high in purity that is suitable for the production of molybdenum compounds as well as for the recovery of the pure metal.

7 Claims, 2 Drawing Figures

PROCESS FOR RECOVERING MOLYBDENUM VALUES FROM SPENT CATALYSTS

The invention relates to improvements in the process of copending U.S. application Ser. No. 763,911, corresponding to French Patent application No. 76.03674, for recovering the molybdenum present in spent catalysts of the type used for the desulfurization of petrols.

These improvements relate on the one hand to the conditions of impregnation to the catalysts with sodium carbonate and, on the other hand, to a treatment for insolubilizing the alumina which is intended to prevent it from being dissolved and subsequently precipitated.

Figure 1:
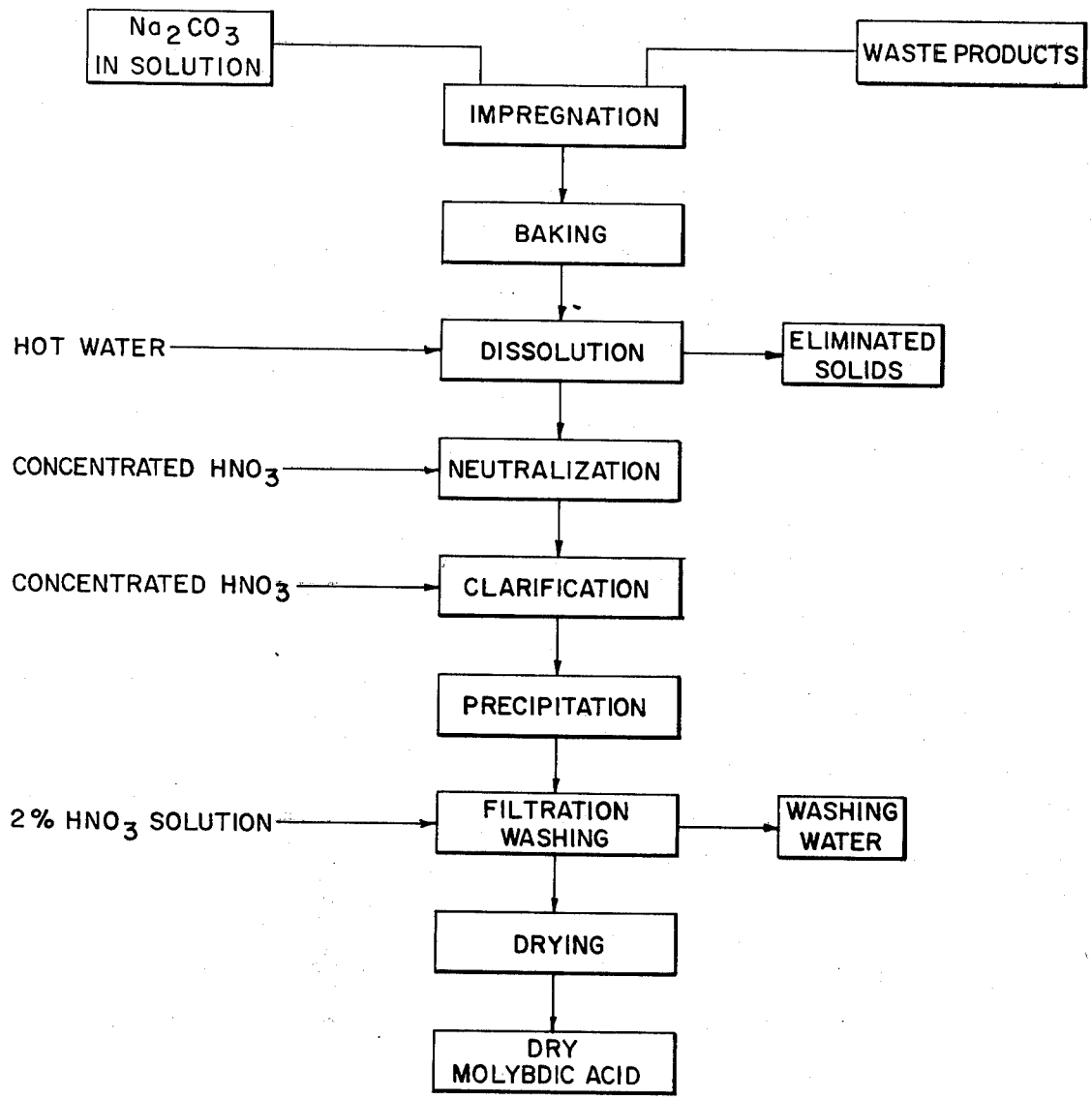
FIG. 1 is a flow chart of the process described in the copending U.S. application.

The process according to the copending U.S. application comprises treating spent catalysts based on active alumina (gamma alumina) containing molybdenum and, optionally, other metals such as cobalt or nickel. These catalysts generally consist of particles a few millimeters in diameter in the shape of small balls or rodlets. In this process, the spent catalysts are subjected beforehand to an oxidizing roasting at a temperature generally below 600° C in order to eliminate the hydrocarbons, the carbon and part of the sulfur with which they are impregnated. After this roasting, the molybdenum present in the form of molybdenum oxide and/or molybdenum sulfide. The treatment for recovering the molybdenum then comprises the following steps (cf. FIG. 1):

(1) impregnating the catalyst particles with a solution of sodium carbonate in a quantity sufficient to obtain, after baking, the molybdenum in the form of sodium molybdate $Na_2MoO_4$ and the sulfur in the form of $Na_2SO_4$. The excess of sodium carbonate in relation to the stoichiometric quantity should not exceed 10% and, better still, 3% by weight, based on the catalyst to be treated;

(2) baking the catalyst particles thus impregnated at a temperature of from 600° to 800° C;

(3) dissolving the soluble salts in hot water at a temperature of from 60° to 100° C, followed by separation of the insoluble fraction by filtration or decantation;

(4) neutralizing the solution cooled beforehand to below 30° C in a first reactor in which it is introduced at the same time as nitric acid of which the rate of flow is regulated in such a way that the pH of the solution obtained is between 5 and 6, the temperature being kept below 30° C and, preferably, not appreciably exceeding 20° C;

(5) clarifying the slightly clouded solution thus obtained by passing it into a second reactor in to which nitric acid is continuously introduced in a quantity substantially equal to that introduced into the first reactor; thus the total quantity of nitric acid amounts to between 1.5 to 2.5 times the quantity necessary to reach a pH value of from 5 to 6.

(6) precipitating the molybdic acid contained in the solution by passing the solution through one or more precipitators in which it is heated to around 100° C;

(7) washing the molybdic acid precipitate;

(8) drying the precipitate.

The treatment thus described enables the molybdenum to be recovered in an excellent yield of the order of 85%. The molybdic acid thus obtained is in the form of a relatively dense precipitate which is easy to wash on a filter. Its aluminum content is generally very low and, in most cases, less than 0.01%.

However, the practical application of this treatment has revealed two difficulties which remain to be obviated.

First of all, it was found that impregnation of the catalyst with a strictly calculated quantity of sodium carbonate solution was relatively difficult to carry out if the solution was to be homogeneously distributed. An aqueous solution containing 400 g of $Na_2CO_3$ per liter was generally used to limit the quantity of water. This solution, initially heated to 70° C, tended to crystallize during its contact with the catalyst which prevented the carbonate from penetrating into the pores of the catalyst particles. In addition, greater dilution was not desirable because the absorption capacity of the catalyst is limited.

Another more serious difficulty was revealed during prolonged tests carried out on a pilot scale to dissolve in hot water the sodium molybdate formed in the catalyst after the carbonate treatment. The formation of progressive deposits was observed on the walls of the containers accommodating the aqueous solution and in the pipes through which this solution circulated. This is because, as stated in the copending U.S. application, dissolution of the sodium molybdate is also accompanied by the dissolution of a certain quantity of sodium aluminate and the ratio by weight of Al to Mo in the solution is generally of the order of 0.1 and, in some cases, may even increase to approximately 0.2. Investigations have shown that the deposit which forms on the walls of the containers and pipes is primarily based on alumina and, more particularly, on alumina trihydrate. The layers thus formed adhere strongly to steel, ebonite, glass and rubber. It would appear that this phenomenon is promoted by the presence of catalyst particles in suspension in the solution which act as seeds. When these layers increase in thickness, they tend to separate locally and the types of solid platelets thus released are entrained by the displacement of the solutions and tend to obstruct the pipes and even to block the circulation pumps.

The inventors have discovered original means of obviating these difficulties. It has been found that these means not only enable a certain number of incidents to be avoided in the working of the process, they also and above all enable a product of more reproducible quality to be obtained in even purer form.

The improved means according to the invention concern above all a significant modification in the first step of the process. Instead of impregnating the catalyst particles with an aqueous solution of sodium carbonate, the catalyst particles are initially mixed with anhydrous sodium carbonate in the form of a fine powder in a mixer of any type, such as a rotary mixer. In general, mixing for a few minutes is sufficient for the particles of sodium carbonate to be distributed over the surface of the catalyst particles. It is then sufficient to add the necessary quantity of water at ambient temperature and to restir the batch in the mixer for a few minutes to obtain virtually complete absorption of the water inside the catalyst particles. Experience has shown that this penetration of water enables the sodium carbonate to penetrate inside the particles, probably by diffusion. During the following step of baking the catalyst thus impregnated, the yield of molybdenum converted into sodium molybdate is at least as high as in the case of impregnation with a hot solution of sodium carbonate in accordance with the prior art.

Another particularly important improvement has made it possible to solve the problem posed by the deposits of alumina trihydrate which are formed during the dissolution of the sodium molybdate in water. This improvement has resulted from the following experimental finding: when the catalyst is left standing for a few days after the treatments of impregnation with sodium carbonate and baking, the deposits which form during the dissolution in water are less abundant. Subsequent tests have shown that the reduction in these deposits was due to the action of the carbon dioxide in the air on the sodium aluminate present in the catalyst particles. An additional step of treating these catalyst particles after baking with a stream of carbon dioxide gas was then introduced into the process. The operating conditions are very simple and it is sufficient for the carbon dioxide gas to be brought into contact with the catalyst particles for a period of time sufficient to enable it to diffuse into them. This result is obtained for example by filling a vertical column of plastics material or of sheet steel with catalyst particles and by circulating a stream of carbon dioxide gas through this column. The quantity of carbon dioxide gas required for an effective treatment is of the order of 1 $Nm^3$ for 60 to 70 kg of catalyst. It does of course depend upon the quantity of alumina present as sodium aluminate in the catalyst. Thus, the range is of the order of 1 $Nm^3$ for 50 to 100 kg of catalyst. Although the exact nature of the physicochemical process which takes place is not entirely known, it is probable that the sodium aluminate is at least partly decomposed with formation of carbonate. This reaction takes place at a temperature close to ambient temperature. The other steps of the process are then carried out in the manner initially described. In this way, deposits are no longer formed on the walls of the containers and pipes during the dissolution treatment by washing the sodium molybdate contained in the catalyst particles with water. In addition, the excess of sodium carbonate to be used in relation to the quantity of catalyst is no longer critical and may readily exceed the limit of 10% specified earlier on which facilitates the working of the process. The small quantities of amorphous alumina in the form of fine particles which are inevitably detached from the catalyst particles during this washing treatment are not troublesome because they do not agglomerate into solid lumps, but remain in divided form. Part is separated by decantation while the rest, which is in suspension in the washing solution, will be retained by filtration before introduction into the neutralization and clarification reactors.

Figure 2:
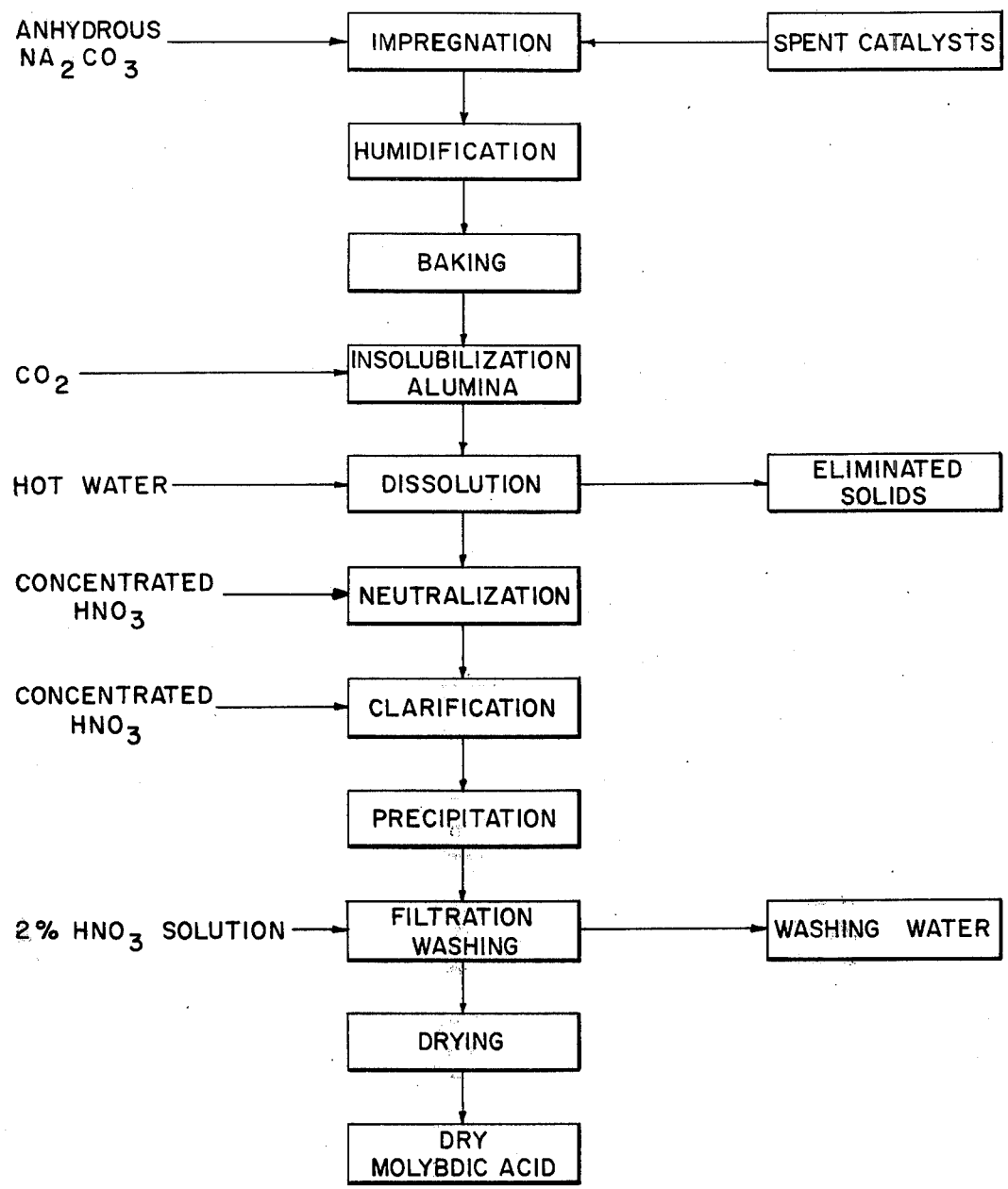
FIG. 2 is a flow chart of the same process improved by the present invention.

The following non-limiting example describes one embodiment of the invention (see flow chart, FIG. 2).

The catalyst treated was a spent catalyst in the form of small rodlets based on gamma alumina which had previously been subjected to an oxidizing roasting during which the hydrocarbons, the carbons and part of the sulfur present in it were eliminated. After roasting, this catalyst contains 8% by weight of Mo, 1.5% by weight of S and 2% of Co. 25 kg of sodium carbonate powder and 150 kg of this catalyst are introduced into a rotary mixer. After 10 minutes' mixing, 64 liters of water at ambient temperature are added, followed by mixing for another 15 minutes. Thereafter the sodium carbonate and the water are almost completely retained by the catalyst particles. The catalyst particles thus impregnated are baked in a rotary furnace at a maximum temperature of 650° to 750° C by means of a propane burner. The residence time in the hot zone is approximately 1 hour. On issuing from the furnace, the product is cooled to a temperature around ambient temperature and is then continuously introduced into the upper end of a vertical column of sheet iron filled with approximately 200 kg of catalyst particles at a rate of 60 to 70 kg per hour. It this column, a stream of carbon dioxide gas circulates upwards at a rate of approximately 1 cubic meter per hour. The catalyst is also continuously removed at the base of the column. The residence time of the catalyst particles in the column is approximately 3 hours. This catalyst is then treated in the manner described in the example given in the copending U.S. application, the successive steps are those which are described at the beginning of that application and of which the flow chart is shown in FIG. 1. However, in order to perfectly separate the insoluble particles which may be suspended during dissolution of the sodium molybdate with hot water, these particles being in particular alumina particles, the dissolution treatment is followed by filtration in a filter press of the alkaline solution before it is introduced into the first neutralization reactor using $HNO_3$. After this filtration step, analysis of the solution shows that its aluminum content is less than 0.03% by weight, based on its molybdenum content. Since the molybdenum content is of the order of 45 to 50 g/l of Mo, it can be seen that the Al content is less than 0.015 g/l as against 5 to 10 g/l in the initial process. Under these conditions, the quantities of nitric acid used in the two successive neutralization and clarification reactors are significantly reduced which represents a considerable saving of reactant. However, the conditions under which the acid is introduced and under which the quantities introduced are controlled by pH measurement in the first reactor are unchanged. The subsequent steps of precipitation of the molybdic acid, followed by filtration, washing and drying, are unchanged.

The molybdic acid obtained by the process thus improved is even purer, especially in regard to its alumina content, than that obtained by the initial process. This is because precipitation is carried out with a solution in which the concentration of aluminum is several hundred times lower than in the initial process. This is a considerable advantage for certain applications of molybdic acid.

Other embodiments of the improved process according to the invention are possible. In particular, it is possible to carry out the improved process while retaining the initial step of impregnation of the catalyst with a solution of sodium carbonate such as described in the copending U.S. application.

What is claimed is:

1. A process for recovering molybdenum in the form of a substantially aluminum-free compound from spent catalyst based on active alumina comprising mixing the spent catalyst with sodium carbonate in the form of an anhydrous powder, whereby the sodium carbonate is distributed over the surface of the catalyst particles, adding water at ambient temperature and restirring to obtain by virtually complete absorption of the water inside the catalyst particles to impregnate the spent catalyst, baking the catalyst thus impregnated at a temperature of from 600° C to 800° C to convert the molybdenum present to sodium molybdate, subjecting the baked spent catalyst to the action of carbon dioxide gas in a quantity of the order of 1 $Nm^3$ for 50 to 100 kg of catalyst and at a temperature close to ambient temperature, washing the carbon dioxide treated catalyst with water to form an alkaline solution, neutralizing and clarifying with concentrated nitric acid to convert the sodium molybdate to molybdic acid.

2. A process as claimed in claim 1 wherein the spent catalyst is preliminarily subjected to an oxidizing roasting to eliminate carbon, hydrocarbons and part of the sulfur.

3. A process as claimed in claim 1 wherein the concentrated nitric acid is progressively added to the alkaline solution in a quantity amounting to between 1.5 to 2.5 times the quantity necessary to reach a pH value of from 5 to 6 while maintaining a temperature close to boiling point to precipitate molybdic acid, then rinsing and drying the molybdic acid.

4. A process as claimed in claim 1, wherein the quantity of carbon dioxide gas used is of the order of 1 $Nm^3$ for 60 to 70 catalyst.

5. A process as claimed in claim 1, wherein the quantity of sodium carbonate used for solubilizing the molybdenum is in excess in relation to the stoichiometrically necessary quantity for obtaining the molybdenum in the form of sodium molybdate and the sulfur in the form of sodium sulfate, this excess expressed in weight of $Na_2CO_3$ being equal to between 1 and 10% of the total weight of the spent catalyst.

6. A process as claimed in claim 1, wherein nitric acid is added in two stages: progressive addition in a first reactor to the alkaline solution containing the molybdenum in dissolved form of such a quantity of $HNO_3$ that the pH reaches a value of from 5.2 to 5.5 while at the same time keeping the temperature of the solution below 30° C and then, in a second reactor, progressive addition to the solution issuing from the first reactor of a quantity of $HNO_3$ substantially equal, within ± 20%, to that introduced into the first reactor while at the same time keeping the temperature of the solution below 30° C.

7. A process as claimed in claim 1, wherein the temperature at which the molybdenum is solubilized by the action of sodium carbonate is between 650° and 750° C.

* * * * *